United States Patent [19]

Mendoza

[11] Patent Number: 4,658,533

[45] Date of Patent: Apr. 21, 1987

[54] FISHING POLE HOLDER

[76] Inventor: Jesse M. Mendoza, 1865 Cornet Pl., Anahiem, Calif. 92807

[21] Appl. No.: 864,522

[22] Filed: May 19, 1986

[51] Int. Cl.$^4$ .............................................. A01K 97/10
[52] U.S. Cl. .................................... 43/21.2; 248/74.2
[58] Field of Search ................ 43/21.2; 248/535, 538, 248/230, 231, 74.2, 74.3

[56] References Cited

U.S. PATENT DOCUMENTS

| D. 190,429 | 5/1961 | Hoagland | 43/21.2 |
|---|---|---|---|
| 1,192,112 | 7/1916 | Porter | 248/229 |
| 1,817,711 | 8/1931 | Rosen | 248/231 |
| 2,721,680 | 10/1955 | Steckman | 43/21.2 |
| 2,885,460 | 5/1959 | Borresen | 248/74.2 |
| 3,031,048 | 4/1962 | Katter | 43/21.2 |
| 4,036,368 | 7/1977 | Munsch | 248/539 |

FOREIGN PATENT DOCUMENTS

| 651267 | 10/1937 | Fed. Rep. of Germany | 248/74.2 |
|---|---|---|---|
| 2123675 | 2/1984 | United Kingdom | 43/21.2 |

Primary Examiner—Gene P. Crosby

[57] ABSTRACT

A holder for releasably securing a fishing pole at a fixed location along the rail of a boat or dock.

8 Claims, 5 Drawing Figures

FISHING POLE HOLDER

BACKGROUND OF INVENTION

The present invention relates to a holder for releasably securing a fishing pole at a fixed location along a rail of a boat or dock whereby a fisherman may leave his pole unattended or may maintain several poles in operation at the same time.

Different types of devices have been previously employed for mounting and holding fishing poles. Two such devices are described in U.S. Pat. Nos. 1,192,112 and 4,0036,368. Both are relatively expensive and require a screw clamping connection to a boat seat or rail, which has proven to be unsatisfactory under actual and repeated use conditions.

BRIEF DESCRIPTION OF INVENTION

The present invention overcomes the foregoing shortcomings of the prior art by providing a holder which may be formed of relatively inexpensive plastic or rubber-like material and which may be easily and quickly attached to a rail simply by wrapping a holder strap around the rail and into a pole receiving channel in a top of the holder base member transverse to the direction of the rail.

DETAILED DESCRIPTION OF INVENTION

Figure 1:
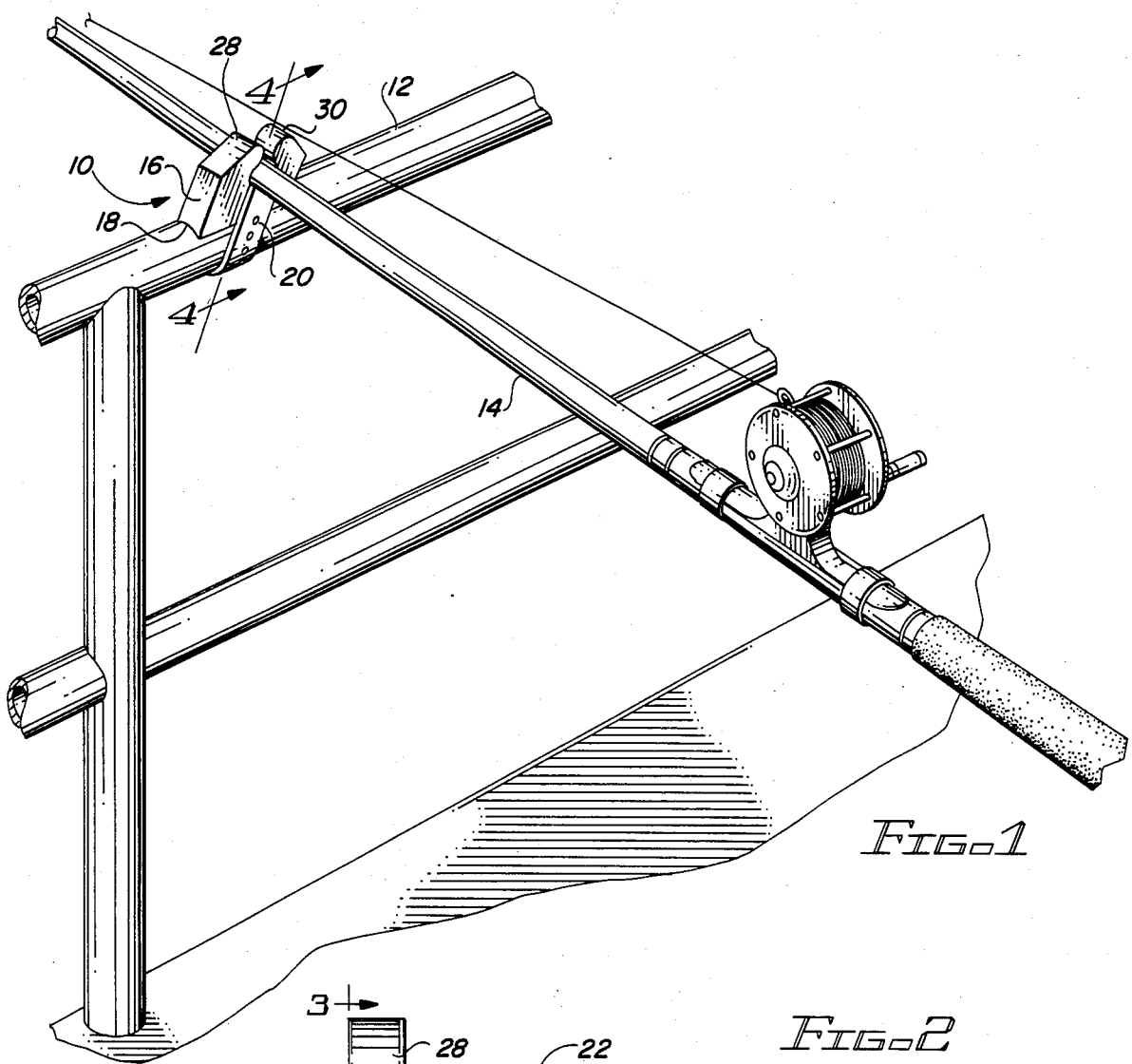
FIG. 1 is a perspective view showing the holder of the present invention secured to a dock rail and holding a fishing pole at a fixed location along the rail.
Figure 2:
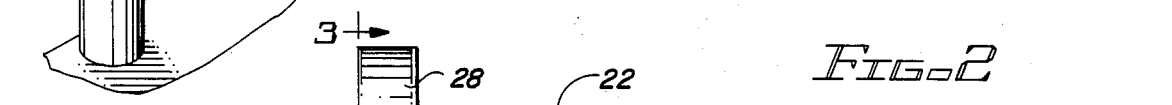
FIG. 2 is a side view of the holder.
Figure 2A:
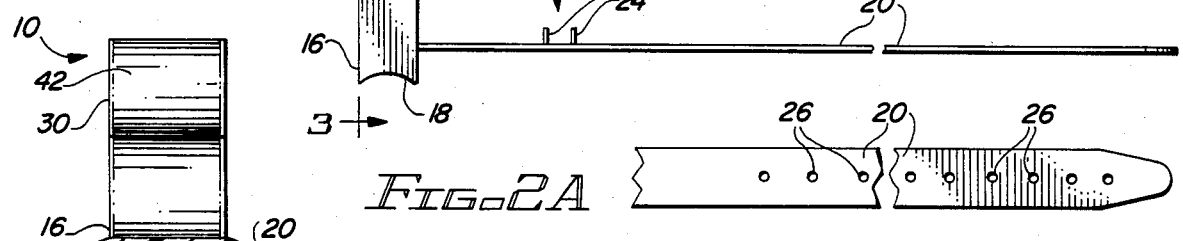
FIG. 2A is a bottom view of an end portion of the strap shown in FIG. 2.

As illustrated in FIG. 1, the present invention comprises a holder 10 releasably connected to a rail 12 for securing a fishing pole 14 at a fixed location along the rail.

Figure 4:
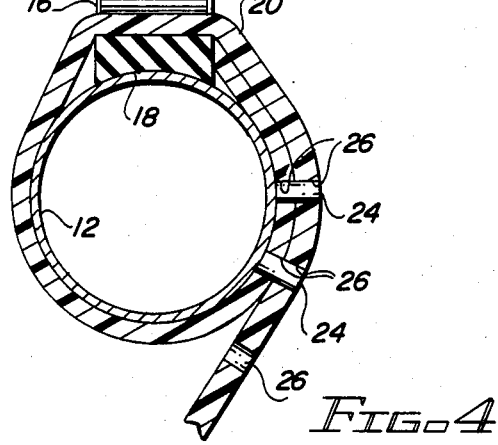
FIG. 4 is an enlarged sectional view of the holder and rail taken along the lines 4—4 in FIG. 1.
Figure 3:
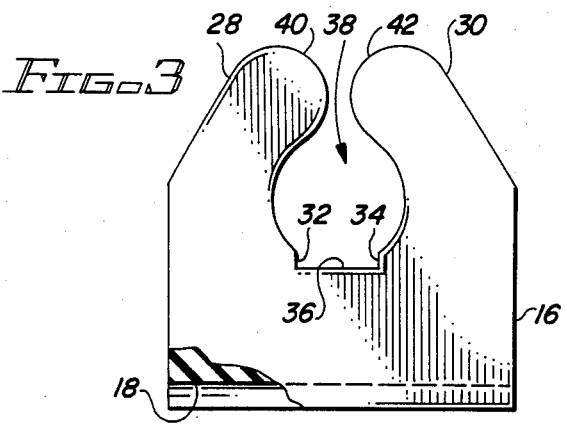
FIG. 3 is an end view of the holder of FIG. 2 looking in the direction of the arrows 3—3.

More specifically, the holder 10 is composed of a resilient hard rubber and comprises a generally rectangular base member 16 having an elongated bottom channel 18 for receiving a top of rail 12 to assist in locating the holder on the rail. A strap 20 extends laterally from a side of the base member 16 transverse to the direction of the bottom channel 18 to wrap around the rail 12 and a top of the base member, thereby releasably securing the holder 10 to the rail. Preferably, the strap 20 is a flat elongated strap having its flat surface adapted to engage and wrap around the rail. The strap 20 carries a fastener 22 comprising a series of projections 24, such as rivits, normal to the strap adjacent the base member 16 and a series of holes 26 in the strap adjacent an opposite end thereof for releasably receiving the projections as shown in FIG. 4.

In addition to the base member 16 and strap 20, the holder 10 includes a pair of resilient arms 28 and 30 extending upwardly from a top of the base member and spaced in the direction of the bottom channel 18 on opposite sides of the strap. The arms 28 and 30 face each other with parallel base portions 32 and 34 defining the base 36 of a top channel 38 for receiving and guiding the strap 20 as it wraps around the top of the base member 16 between the arms. From the parallel base or sidewall portions 32 and 34, the arms 28 and 30 curve outwardly and upwardly from each other to define a generally circular central region for the top channel 38 into which the fishing pole 14 may rest upon being inserted into the channel. From the central region, the arms extend upwardly toward each other at upper ends 40 and 42. The ends 40 and 42 are adapted to separate as the pole is inserted downwardly into the channel 38 and to snap over a top of the pole as the pole nests in the channel.

Thus constructed, it is a simple and quick task to connect the holder 10 to the rail 12 and secure the pole 14 to the holder. The fisherman simply places the base of the holder on the rail with the bottom channel 18 in line with the rail and wraps the strap around the rail securing the fastener 22. He then rests the pole in the top channel 38 as illustrated in FIG. 1. To release the pole and disconnect the holder the process is simply reversed.

Having described the invention, what is claimed is:

1. In combination:
    a rail on a dock or boat;
    a fishing pole; and
    a holder releasably secured to the rail and releasably holding the fishing pole at a fixed location along the rail to extend and rest in a direction transverse to the rail, the holder comprising
      a base member having a bottom bearing on a top of the rail,
      a strap extending outwardly from a side of the base member and wrapping around the rail and a top of the base member to releasably secure the holder to the rail, and
      a pair of arms extending upwardly from the top of the base member on opposite sides of the strap and combining with the top of the base between the arms to define a channel transverse to the direction of the rail for (i) receiving the strap as it wraps around the rail and the base member and (ii) releasably receiving the fishing pole in the direction of the channel to hold the pole in place along the rail.

2. The combination of claim 1 wherein: the arms
    (i) are formed of a resilient material to bend outwardly when the fishing pole is inserted into the channel and to grip the pole as it is nested therein,
    (ii) extend vertically and parallel to each other immediately adjacent the top of the base member to define parallel vertical opposing sidewalls for the channel adjacent the base member for receiving and guiding the strap as it wraps around the rail,
    (iii) curve outwardly and upwardly from each other above the parallel sidewalls to define a generally circular central region for the channel into which the fishing pole may nest upon being inserted into the channel, and
    (iv) extend inwardly toward each other above the circular central region to snap over a top of the fishing pole nested in the channel.

3. The combination of claim 2 wherein a bottom surface of the base member is shaped to follow the contour of the rail upon which it bears.

4. The combination of claim 1 wherein the strap carries fastener means adjacent the base member for releasably securing the strap in a wrapped condition around the rail.

5. The combination of claim 4 wherein the fastener means includes projections normal to the strap adjacent the base member and holes through the strap adjacent an opposite end thereof for releasably receiving the projections.

6. A holder for releasably holding a pole at a fixed location along a rail, comprising:
- a generally rectangular base member having a bottom channel for receiving a top of the rail upon which the holder is to be secured;
- a strap extending outwardly from a side of the base member transverse to the bottom channel for wrapping around the rail and over a top of the base member to releasably secure the base member to the rail; and
- a pair of resilient arms extending upwardly from a top of the base member and spaced in the direction of the bottom channel on opposite sides of the strap to face each other with parallel base portions defining the base of a top channel for receiving and guiding the strap as it wraps around the top of the base member between the arms, the arms further extending outwardly from the parallel base portions to receive and releasably hold the pole in the direction of the top channel transverse to the bottom channel.

7. The holder of claim 6 wherein the strap carries fastener means adjacent the base member for releasably securing the strap in a wrapped condition around the rail.

8. The holder of claim 7 wherein the fastener means includes projections normal to the strap adjacent the base member and holes through the strap adjacent an opposite end thereof for releasably receiving the projections.

* * * * *